United States Patent [19]

Mahlein

[11] Patent Number: 4,770,496

[45] Date of Patent: Sep. 13, 1988

[54] EDGE INTERFERENCE FILTER FOR OPTICAL COMMUNICATION TRANSMISSION IN WAVELENGTH-DIVISION MULTIPLEX

[75] Inventor: Hans F. Mahlein, Unterhaching, Fed. Rep. of Germany

[73] Assignee: Siemens Aktiengesellschaft, Berlin and Munich, Fed. Rep. of Germany

[21] Appl. No.: 906,207

[22] Filed: Sep. 12, 1986

[30] Foreign Application Priority Data

Sep. 17, 1985 [DE] Fed. Rep. of Germany ....... 3533170

[51] Int. Cl.[4] ............................................. G02B 5/28
[52] U.S. Cl. ..................................... 350/166; 350/164
[58] Field of Search ........................ 350/164, 165, 166

[56] References Cited

U.S. PATENT DOCUMENTS

| | | | | |
|---|---|---|---|---|
| 4,373,782 | 2/1983 | Thelen | ................................ | 350/166 |
| 4,395,090 | 7/1983 | Mahlein | ............................... | 350/166 |
| 4,615,034 | 9/1986 | Von Gunten et al. | ............... | 35/166 |

OTHER PUBLICATIONS

H. F. Mahlein, "A High Performance Edge Filter for Wavelength-Division Multi-Demultiplexer Units" *Optics and Laser Technology* Feb. 1981, pp. 13-20.

H. A. Macleod, *Thin Film Optical Filters*, Hilger, London, 1969, pp. 111-153.

A. Thelen, "Equivalent Layers in Multilayer Filters", *Journal of the Optical Society of America*, vol. 56, No. 11, Nov. 1966, pp. 1533-1538.

L. I. Epstein "The Design of Optical Filters", *Journal of the Optical Society of America*, vol. 42, No. 11, Nov. 1952, pp. 806-810.

Von Kurt Schuster, "Anwendung der Vierpoltheorie auf die Probleme der optischen Reflexionsminderung, Reflexionsverstärkung und der Interferenzfilter" *Annalen der Physik*, Folge 6, Bd 4, 1949, pp. 352-356.

L. A. Catalan, "Some Computed Optical Properties of Antireflection Coatings", *Journal of the Optical Society of America*, vol. 52, No. 4 Apr. 1962, p. 437440.

A. Reichelt et al., "Wavelength-Division Multi Demultiplexers for Two-Channel Single-Mode Transmission Systems" *Journal of Lightwave Technology*, vol. LT-2, No. 5, Oct. 1984, pp. 675-681.

A. F. Turner et al., "Multilayer Mirrors with High Reflectance Over an Extended Spectral Region" *Applied Optics*, vol. 5, No. 1, Jan. 1966, pp. 69-76.

*Primary Examiner*—Bruce Y. Arnold
*Assistant Examiner*—Martin Lerner
*Attorney, Agent, or Firm*—Hill, Van Santen, Steadman & Simpson

[57] ABSTRACT

An edge interference filter is composed of a layer sequence of a total of 21 alternately arranged high refractive index layers and low refractive index layers with the high refractive index layers being composed of $TiO_2$ and the low refractive index layers being composed of $SiO_2$. The individual layers having an optical layer thickness standardized to a 20° angle of incidence and to ¾ wavelength of the attenuation band center wavelength of 823 nm with the first and twentyfirst layers having a thickness of 0.241 of the standardized thickness, the second and twentieth layers having a thickness of 0.914 of the standardized thickness and the remaining third through nineteenth layers having a thickness of one standardized thickness.

1 Claim, 2 Drawing Sheets

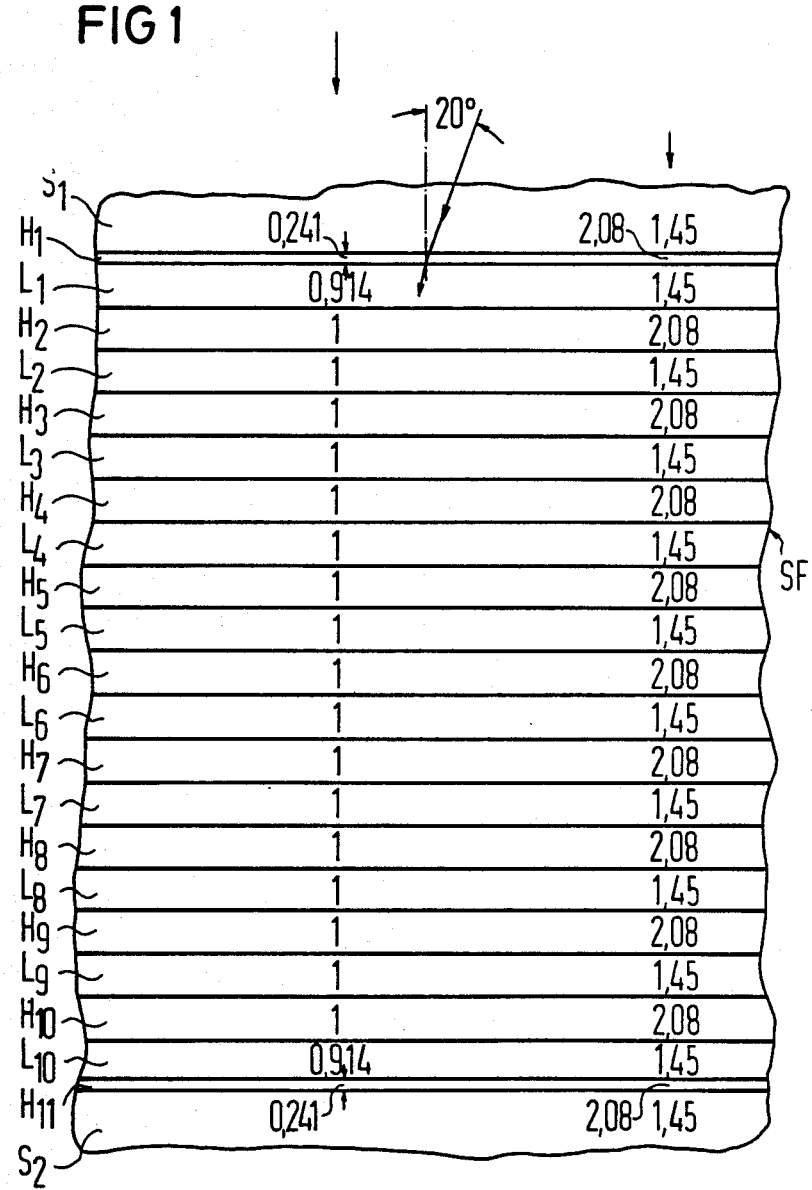

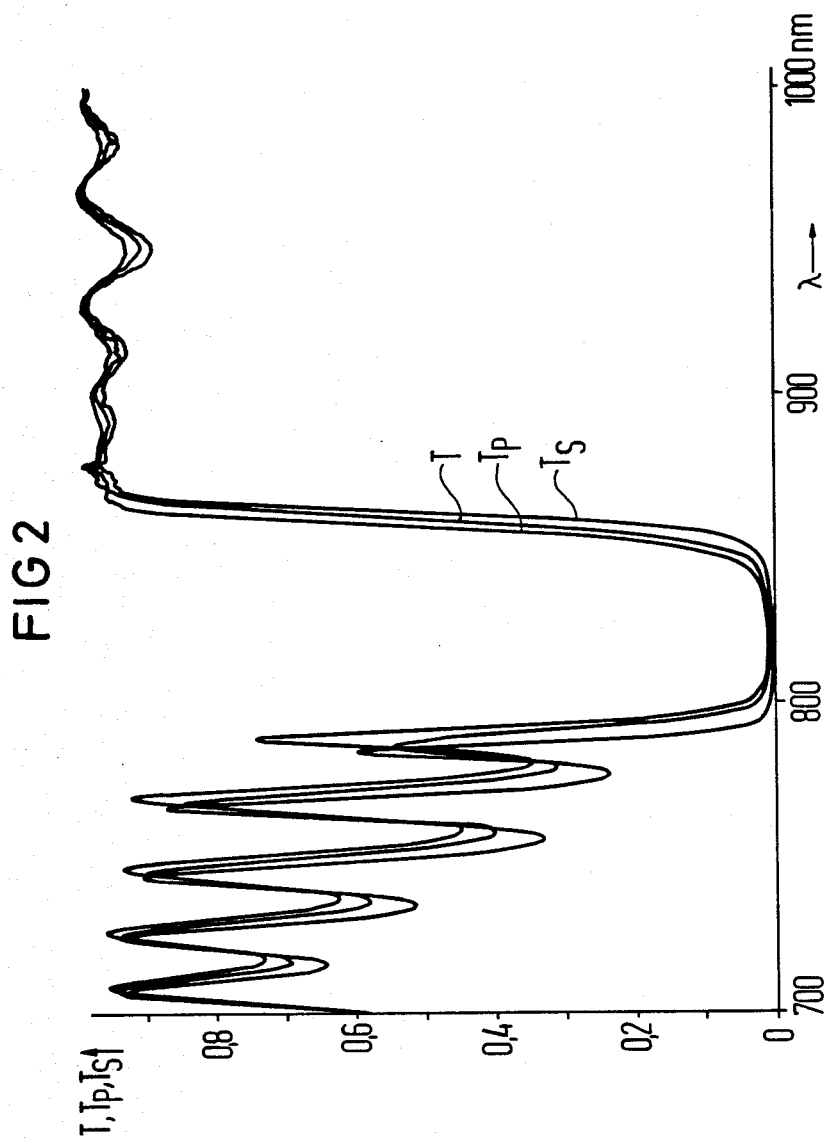

EDGE INTERFERENCE FILTER FOR OPTICAL COMMUNICATION TRANSMISSION IN WAVELENGTH-DIVISION MULTIPLEX

BACKGROUND OF THE INVENTION

The present invention is directed to an edge interference filter for an optical communication transmission in wavelength-multiplex which filter comprises a layer sequence arranged between adjacent outer media or substrates with the sequence being composed alternately of layers of high index of refraction and layers of low index of refraction with the two outer layers of the layer sequence which are adjacent to the outer media being of the higher index of refraction.

Filters having a layer sequence of alternating high and lower index of refraction are known. Examples are disclosed in an article by F. H. Mahlein, "A High Performance Edge Filter for Wavelength-Division Multi-Demultiplexer Units", *Optics and Laser Technology*, February 1981, pages 13–20. Under certain conditions, pairs of spectrally complementary edge interference filters are required for optical communication transmissions and wavelength-division multiplex. Such pairs in an unglued execution are known and examples are disclosed in a book by H. A. Macleod, *Thin Film Optical Filters*, Hilger, London, 1969, pages 111–153.

The theory of glued edge interference filters (see the above mentioned article by Mahlein) shows that filters for transmitting short-wave can be realized with a standard layer materials composed of $SiO_2$ and $TiO_2$ only for narrow interchannel spacings of about 40 nm given a wavelength of 1300 nm and a 20° angle of incidence. Filter for transmitting the long-wave can only be realized for greater interchannel spacings of about 120 nm given a wavelength of 1300 nm and a 20° angle of incidence.

By contrast, edge interference filters transmitting long-wave for narrow interchannel spacings and filters transmitting short-wave for large interchannel spacings cannot be realized with the layer structures hitherto described.

SUMMARY OF THE INVENTION

The object of the present invention is to provide a glued edge interference filter transmitting long-wave for narrow interchannel spacing.

Proceeding from an edge interference filter of the initially disclosed type, this object is achieved by the layer sequence being composed of a total of 21 layers composed of both high index refraction layers and low index refraction layers, the higher index refraction layers are composed of material having an index of refraction of $2.08\pm0.05$ and each of the low index refraction layers is composed of material having a refractive index of $1.45\pm0.05$, the individual layers have a standardized optical layer thickness obtained with a 20° angle of incidence and at $\frac{3}{4}$ of a wavelength of an attenuation band center wavelength of 823 nm, the layer thickness having an allowable deviation of at most 2% with the first and twenty-first layers being of a thickness of 0.241 of the standardized thickness, with the second and twentieth layers being of a thickness of 0.914 of the standardized thickness and with the third through nineteenth layers being a constant one standardized thickness.

The filter of the invention represents a spectrally complementary counterpart of the known glued edge interference filter transmitting short-wave. The layer sequence of the filter of the invention can be advantageously constructed with only two layer materials and makes due with a relatively low number of layers. It can separate the emmission of two laser diodes having emmission wavelengths of 840 nm and 880 nm.

BRIEF DESCRIPTION OF THE DRAWINGS

FIG. 1 is an enlarged partial side view of an edge interference filter in accordance with the present invention; and FIG. 2 is a graphical presentation of the measured transmittance of the filter for unpolarized radiation, for the s-component and p-component of radiation with regard to the wavelength.

DESCRIPTION OF THE PREFERRED EMBODIMENTS

The principles of the present invention are paricularly useful in an edge interference filter illustrated in FIG. 1. The edge interference filter is composed of a layer sequence SF arranged between an outer media $S_1$ and $S_2$ with the layer sequence SF being composed of a total of 21 layers $H_1$, $L_1$, $H_2$, $L_2$ ..., $H_{10}$, $L_{10}$ and $H_{11}$ with the layers alternately having a high and lower index of refraction. The two outer layers $H_1$ and $H_{11}$ of the layer sequence SF which are immediately adjacent to the outer media $S_1$ and $S_2$ are composed of the material with the high index of refraction. The two outer media $S_1$ and $S_2$ are composed of a substrate, for example, of a glass fiber core having a refractive index of $1.45\pm0.05$ or, respectively, of superstrates, for example, of transparent optical adhesive having the same refractive index as the substrates.

The layers of the high index of refraction or the more highly refractive layers $H_1$, $H_2$, ..., $H_{10}$ and $H_{11}$ of the layer sequence SF are composed of material having an index of refraction of $2.08\pm0.05$, and this material for example can be $TiO_2$. The layers of a lower index of refraction or the more lowly refractive layers $L_1$, $L_2$, ..., $L_{10}$ of the layer sequence SF are composed of material having an index of refraction of $1.45\pm0.05$, and an example of this material is $SiO_2$ of which the substrates or superstrates can also be composed.

Shown in FIG. 1, for each of the layers $H_1$, $L_1$, $H_2$, $L_2$, ..., $H_{10}$, $L_{10}$ and $H_{11}$ is the appertaining, effective optical layer thickness obtained with an angle of incidence of 20° and standardized to $\frac{3}{4}$ wavelength of an attenuation band center wavelength of 823 nm. Also, the indexes of refraction for the media $S_1$, $S_2$ and each of the individual layers of the layer sequence SF are also provided.

As illustrated, the layers $H_1$ and $H_{11}$ each have a thickness of 0.241 of the standardized layer thickness while the layer $L_1$ and $L_{10}$ each have a thickness of 0.914 of the standardized layer thickness. The remaining layers $H_2$, $L_2$, $H_3$, $L_3$, ..., $H_9$, $L_9$ and $H_{10}$ each have a layer thickness of one standardized thickness.

The filter is of an order 1, i.e. the dimensioning wavelength amounts to 2469 nm and the middle of the attenuation band, which is of interest for the application, lies at 823 nm. It thus, exhibits a steep filter edge.

FIG. 2 shows the spectral transmittance curves T, $T_s$ and $T_p$ and also shows the transmittance of the edge interference filter for an angle of incidence of 20°.

The transmittance T curve is for unpolarized radiation, the transmittance $T_s$ curve is for an s-component, which is the component of linearly polarized radiation which is perpendicular to the plane of incidence, and the transmittance $T_p$ curve is for the p-component, which is the component for the radiation parallel to the plane of incidence.

The present filter can also be characterized in brief as following a formula-like symbolism:

S; 0.241 H; 0.914 L; (HL)$^8$; H; 0.914 L; 0.241 H; S.

wherein S stands for the outer medium, H for the more highly refractive layers, L for the more lowly refractive layers, a number preceding H or L indicates the amount of the standardized layer thickness for the appertaining layer. A lack of a number preceding the H or L means that the layer thickness of the appertaining layer is equal to one standardized layer thickness. The eighth power of the parenthetical expression (HL) indicates that this period composed of the two layers is repeated eight times.

Although various minor modifications may be suggested by those versed in the art, it should be understood that I wish to employ within the scope of the patent granted hereon, all such modifications as reasonably and properly come within the scope of my contribution to the art.

I claim:

1. In a glued edge interference filter for optical communication transmissions in a wave-division multiplex, said filter comprising a layer sequence arranged between adjacent outer substrates, said layer sequence being composed of alternately arranged layers having a high index of refraction and a low index of refraction, the two outer layers of the layer sequence, which are adjacent to the outer substrates, having the high index of refraction, the improvements comprising said layer sequence being composed of a total of 21 layers with each of the layers of the high index of refraction being composed of a material having an index of refraction of 2.08±0.05 and each of the layers having a low index of refraction being composed of a material having an index of refraction of 1.45±0.05, each of the individual layers having a standardized, optical layer thickness of $\frac{3}{4}$ wavelength of an attenuation band center wavelength of 823 nm obtained at 20° angle of incidence, said layer thicknesses having an allowable deviation of at most 2% with the first and twentyfirst layers having a thickness of 0.241 of the standardized thickness, the second and twentieth layers being of a thickness 0.914 of the standardized thickness and the third through the nineteenth layers having a thickness of one standardized thickness.

* * * * *